Nov. 1, 1927.
I. AMUNDSEN
REFRIGERATING PLANT
Filed Oct. 29, 1926
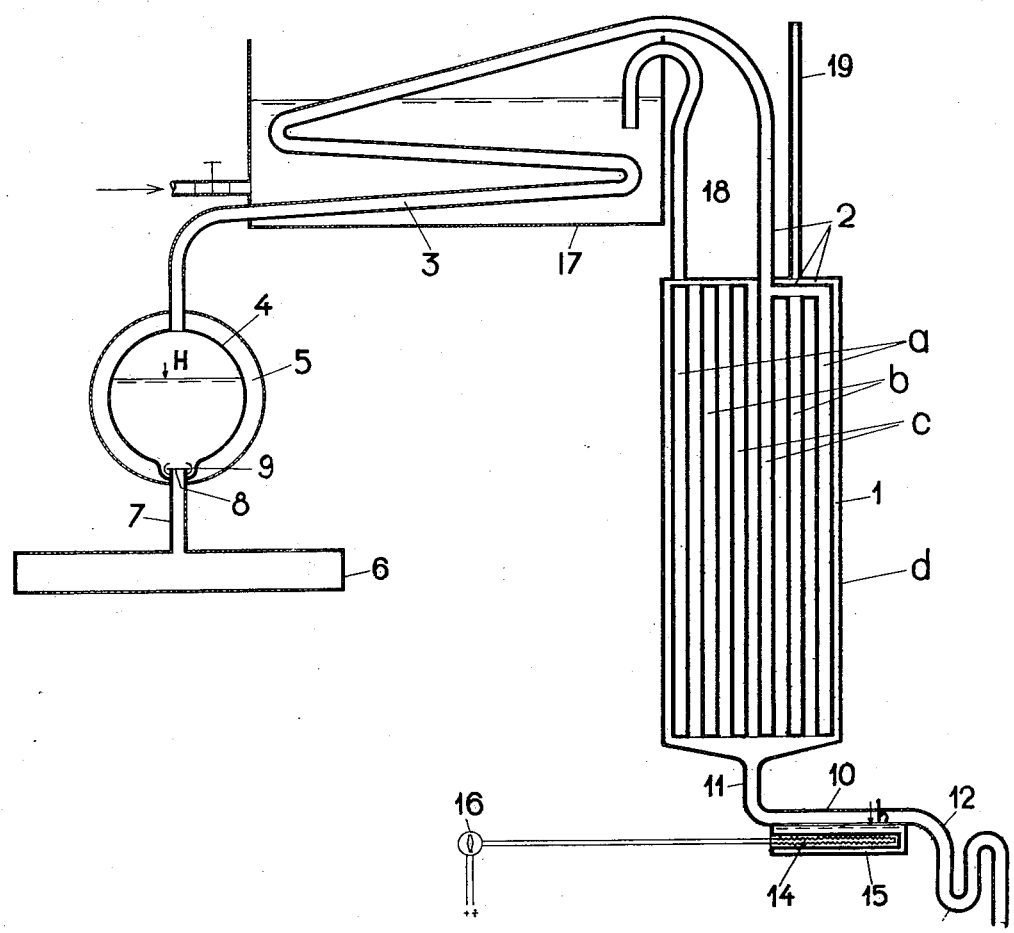
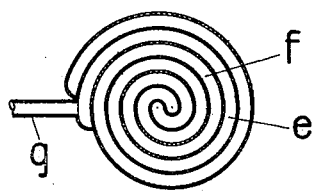
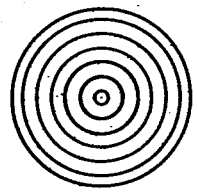
INVENTOR
Ivar Amundsen Patented Nov. 1, 1927.

1,647,208

UNITED STATES PATENT OFFICE.

IVAR AMUNDSEN, OF OSLO, NORWAY.

REFRIGERATING PLANT. REISSUED

Application filed October 29, 1926, Serial No. 145,037, and in Norway January 28, 1926.

The present invention relates to refrigerating plants of the adsorption or absorption type. More particularly the invention relates to refrigerating plants of this type in which there is utilized a gas adsorbing medium such as activated coal, which alternately adsorbs and when heated liberates the refrigerating fluid, and according to one feature of the invention, the same consists in using an alcohol, more particularly methyl alcohol ($CH_3.OH$) or ethyl alcohol ($C_2H_5.OH$) as a refrigerating fluid. Under the temporary conditions prevailing in the refrigerating plants said alcohol is adsorbed in large quantities without the use of mechanical devices in suitable adsorption mediums and is easily liberated again by heating. The alcohol having further a high evaporation heat and the pressure being always less than the atmospheric pressure in the refrigerating plant, the refrigerating liquid of which is an alcohol, the thermic efficiency of the plant is very high.

Further the refrigerating plant is explosion free and a leakage, if any, will not be dangerous to the surroundings. Owing to the low pressure the tubes and vessels of the plant may be manufactured from very thin material, thus reducing the cost of the manufacture.

Another feature of the invention consists in using animal-coal (blood-coal, bone-coal) as adsorption medium it having been proved by experiments that particularly satisfactory results may be obtained by the use of coals of this kind, particularly satisfactory results being obtained by the use of Mercks carbo-medicinalis.

A further feature of the invention relates to obtaining efficient heat transmitting effects in the refrigerating plant of the kind specified, comprising a vessel, containing a solid adsorption absorption medium, such as for instance active coal and consists in providing the said vessel with a number of spaced walls, the space between the walls being alternately filled by the said adsorption medium and alternately adapted to be filled by the medium for cooling or heating the said adsorption medium.

A further feature of the invention relates to refrigerating plants of the type specified, having between the condenser and the evaporator of the refrigerating plant a collecting vessel for the refrigerating fluid which is condensed during the liberating period and according to this feature the invention consists in providing the said vessel or combining the said vessel with a valve or the like, which is adapted during the liberating period to wholly or substantially close the supply conduit to the evaporator, said valve being however opened at the beginning of the evaporating period, when the pressure above the valve has been sufficiently depressed so as to permit the refrigerating liquid in the collecting vessel to pass by gravity to the evaporator. Hereby it is obtained in a simple manner that the vapor liberated during the liberating period is prevented from contact with the cold evaporator and at the same time it is obtained that the vapor leaving the evaporator during the evaporating period may be in a dry condition.

On the drawing Fig. 1 illustrates diagrammatically one form of the invention, Fig. 2 is a cross-section through the generator 4 shown in Fig. 1 taken at an intermediate point adjacent the middle of said generator and Fig. 3 shows a cross section through a modified form of the adsorption vessel.

On Fig. 1, 1 is the vessel containing for instance a gas-adsorbing medium, said vessel comprising a number of co-axial double-walled cylinders $a$, $b$, $c$ which are filled with the said medium and which are all connected by means of tube 2 to the condenser 3. In the space between the cylinders and between the exterior cylinder $d$ and cylinder $a$ fluid for cooling or heating the adsorption medium is supplied.

According to the form of adsorption vessel illustrated on Fig. 3 the same comprises a double-walled spiral $e$ which is filled with the adsorption medium, while fluid for heating or cooling the medium is supplied to the space between the evolutions of the spiral. The spirally wound vessel $e$ is connected by means of tube $g$ with the condenser.

4 is the collecting vessel for the refrigerating liquid which is liberated during the heating period from adsorption vessel 1 and which is subsequently condensed in the condenser 3. The said collecting vessel 4 may be provided with an insulating cover 5. 6 is the evaporator. From the bottom of the collecting vessel 4 the connecting tube 7 leads to the evaporator, said tube 7 being provided with a non-returning valve 8. After the termination of the evaporating period the evaporator still contains a small quantity of refrigerating liquid. At the end of the subsequent liberating period the liquid level in the collecting vessel has risen to line H. When the evaporating period starts again a certain quantity of the refrigerating liquid in the collecting vessel is first evaporated until the pressure in this collecting vessel has decreased so much that the non-return valve 8 is lifted by means of the pressure existing in evaporating vessel 6. When said valve is lifted, vapor is let out from the evaporating vessel and at the same time refrigerating liquid from the collecting vessel H follows down into the evaporating vessel. Guides 9 limit the movement of the valve.

A further feature of the invention relates to the heating device for the adsorbing vessel.

To avoid dangerous temperatures in the vessel it has been suggested to heat the vessel in a water-bath. This however necessitates the heating of a considerable quantity of water which tends to reduce the termal efficiency of the plant. This draw-back is avoided according to the invention by heating the vessel by means of steam developed in a boiler mounted below the adsorbing vessel in such a manner that the steam condensed on the walls of the adsorbing vessel is returned automatically by its own gravity to the boiler where it is again evaporated. The amount of water used for this purpose may accordingly be very small.

As the absorbing vessel is heated by means of a source of heat located outside the vessel one is always sure of under no circumstances heating the adsorption vessel to a temperature above 100° C.

The above mentioned heating device is seen on Fig. 1.

The boiler 10 which is in communication by means of tube 11 with the space closing the exterior surface of the vessel 1 is provided with an outlet 12 having a liquid-lock 13. The boiler 10 may be heated in any well known manner for instance as indicated by means of an electric heating element 14 mounted in the tube 15 inside the boiler and controlled by means of switch 16.

The cooling of the adsorption vessel may take place in accordance with applicant's Patent No. 1,632,387 by means of cooling liquid-supply from a condenser vessel 17 through siphon 18, and the exterior cylinder $d$ enclosing the adsorption vessel may be in direct communication with the atmosphere as indicated by means of tube 19.

After the termination of the cooling period for vessel 1 the water level will be as indicated by line $h$. During the subsequent heating period the steam developed escapes into vessel $d$ and is condensed on the walls of adsorption cylinders $a$, $b$, $c$, the condensed water flowing back to boiler 10. The water lock 13 prevents the escape of steam through tube 12.

Claim:

A refrigeration process which comprises, adsorbing in activated coal the vapors of a mass of monohydric alcohol which is in heat exchanging relation with a medium to be cooled, then heating said activated coal to drive off the adsorbed alcohol, condensing said alcohol and after the evaporation of said condensed alcohol in the refrigerating act, repeating the above steps in cyclic operation.

In testimony whereof I have signed my name to this specification.

IVAR AMUNDSEN.